United States Patent
Li et al.

(10) Patent No.: US 6,370,392 B1
(45) Date of Patent: Apr. 9, 2002

(54) METHOD AND SYSTEM FOR DETECTING DISCONTINUOUS TRANSMISSION MODE

(75) Inventors: Jun Li, Dallas; Chung-Ching Wang, Plano, both of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/594,064

(22) Filed: Jun. 14, 2000

Related U.S. Application Data

(60) Provisional application No. 60/153,655, filed on Sep. 13, 1999.

(51) Int. Cl.[7] .............................................. H04B 7/005
(52) U.S. Cl. ...................... 455/522; 455/436; 370/329; 370/330; 370/331; 370/335; 370/336; 370/337; 370/347; 370/468; 375/219; 375/295; 375/316; 375/346; 375/347; 704/215; 704/270
(58) Field of Search .................... 455/13.4, 436, 455/522, 68, 69, 70, 701, 702, 703; 370/321, 329, 330, 331, 335, 337, 342, 345, 347, 468; 704/215, 270; 375/132, 216, 219, 295, 299, 316, 341, 342, 346, 347, 349

(56) References Cited

U.S. PATENT DOCUMENTS

| | | | | |
|---|---|---|---|---|
| 5,422,909 A | * | 6/1995 | Love et al. | 375/200 |
| 5,835,889 A | * | 11/1998 | Kapanen | 704/215 |
| 6,212,368 B1 | * | 4/2001 | Ramesh et al. | 455/277.2 |

FOREIGN PATENT DOCUMENTS

| | | | | |
|---|---|---|---|---|
| WO | 98/36508 | * | 8/1998 | H04B/7/005 |
| WO | 99/10995 | * | 3/1999 | H04B/7/26 |
| WO | 99/56405 | * | 11/1999 | H04B/7/005 |
| WO | 01/01610 | * | 1/2001 | H04B/7/26 |

OTHER PUBLICATIONS

Rappaport, Theodore A. "Wireless Communications Practice and Principles", Prentice Hall PTR 1996. p. 423.*

Gibson, Jerry D. "The Mobile Communications Handbook", CPR Press 1996. p. 414.*

* cited by examiner

Primary Examiner—Dwayne Bost
Assistant Examiner—Miguel D. Green
(74) Attorney, Agent, or Firm—Haynes and Boone LLP

(57) ABSTRACT

Various methods for effectively detecting the discontinuous transmission (DTX) mode are provided both from the physical layer perspective and from the medium access layer (MAC) perspective. The DTX mode transmission on reverse supplemental channels is detected by comparing a transmitted and a received power ratio of a pilot channel and a supplemental channel. For a reverse link communication, the DTX mode transmission is detected on dedicated control channels. The DTX mode transmission on a forward link supplemental channel can also be detected by monitoring both the transmitted and received power ratios of a primary power control channel and the supplemental channel. As an alternative to or in combination with the above mentioned methods, in order to monitor the DTX mode, a new network parameter is introduced which requires a change in the IS-2000-3 standard. This parameter acts as an indicator signaling to a receiver, from the MAC layer, that the transmitter has entered into the DTX mode.

20 Claims, 2 Drawing Sheets

METHOD AND SYSTEM FOR DETECTING DISCONTINUOUS TRANSMISSION MODE

CROSS REFERENCE

This application claims the benefit of U.S. Provisional Application Serial No. 60/153,655, which was filed on Sep. 13, 1999.

BACKGROUND OF THE INVENTION

The present invention relates generally to telecommunication networks, and more particularly, to a method and system for detecting a discontinuous transmission mode of operation of a network.

As shown in FIG. 1, in a common wireless communication network 10, a mobile unit (MU) 12 receives transmitted information from a base transmission station (BTS) 14 through a forward link, and communicates back to the BTS through a reverse link. It is understood that the BTS 14 may be representative of several different components, including a base station controller and a mobile switching center. Modern communication technologies such as CDMA2000 allow a discontinuous transmission (DTX) mode to be operated on a supplemental channel (SCH) for both forward and reverse links. Before the data is transmitted on the supplemental channel, a MU has to reserve the radio resource for that particular channel. This is accomplished via a supplemental channel assignment procedure, during which a set of parameters for the assigned channel is communicated between the MU and BTS. These parameters may include data rate, coding method, frame length and the duration of the assigned channel. The DTX mode allows the transmission to be stopped on the assigned channel before the end of assigned time slot if there is no data to transmit.

There are several problems associated with DTX mode. Some of the problems relate to fading. In a fading environment, a transmitted frame may be erased if the transmission link experiences a deep fade. For a SCH, the MU has to determine the number of erasure frames received. Such a determination provides information for possible adjustment of the transmission power via signaling messages. Thus, the MU needs to determine, without any prior knowledge of the current transmission mode, whether the transmitted frame is erased due to fading or that data was discontinued (the transmitter has entered the DTX mode). An incorrect determination of erasure frames will trigger unnecessary signaling messages between the MU and the BTS. Further, these messages may cause the transmission power level to be raised too high once the transmission resumes.

Therefore, what is needed is a method for accurately detecting the DTX mode from a receiver side so that efficient system performance can be maintained.

SUMMARY OF THE INVENTION

Various methods for effectively detecting the discontinuous transmission (DTX) mode are provided both from the physical layer perspective and from the medium access layer (MAC) perspective. These methods can work together and/or individually. Furthermore, certain features of different methods can be combined in various manners. One embodiment provides a method for detecting the DTX mode transmission on reverse supplemental channels by comparing the transmitted and the received power ratio of a pilot channel and a supplemental channel. Another embodiment detects the DTX mode transmission on a dedicated control channels on the reverse link.

In some embodiments, the DTX mode transmission on a forward link supplemental channel is detected. The transmitted and received power ratios of a primary power control channel and the supplemental channel are monitored to indicate that the DTX mode is being entered by a base transmission station (BTS).

In some embodiments, a new parameter to the MAC layer is provided. The parameter indicates to the receiver that the transmitter has entered into the DTX mode.

Any of the disclosed embodiments provides a reliable way to detect the DTX mode. Reliable detection of DTX mode saves the transmitter power and reduces the interference level in the cell. More importantly, improper operations of the BTS and a mobile unit (MU) are avoided, and thus the rate for call drop is reduced. Therefore, the present invention enhances the efficiency and reliability of BTSs.

DESCRIPTION OF THE PREFERRED EMBODIMENT

Figure 1:
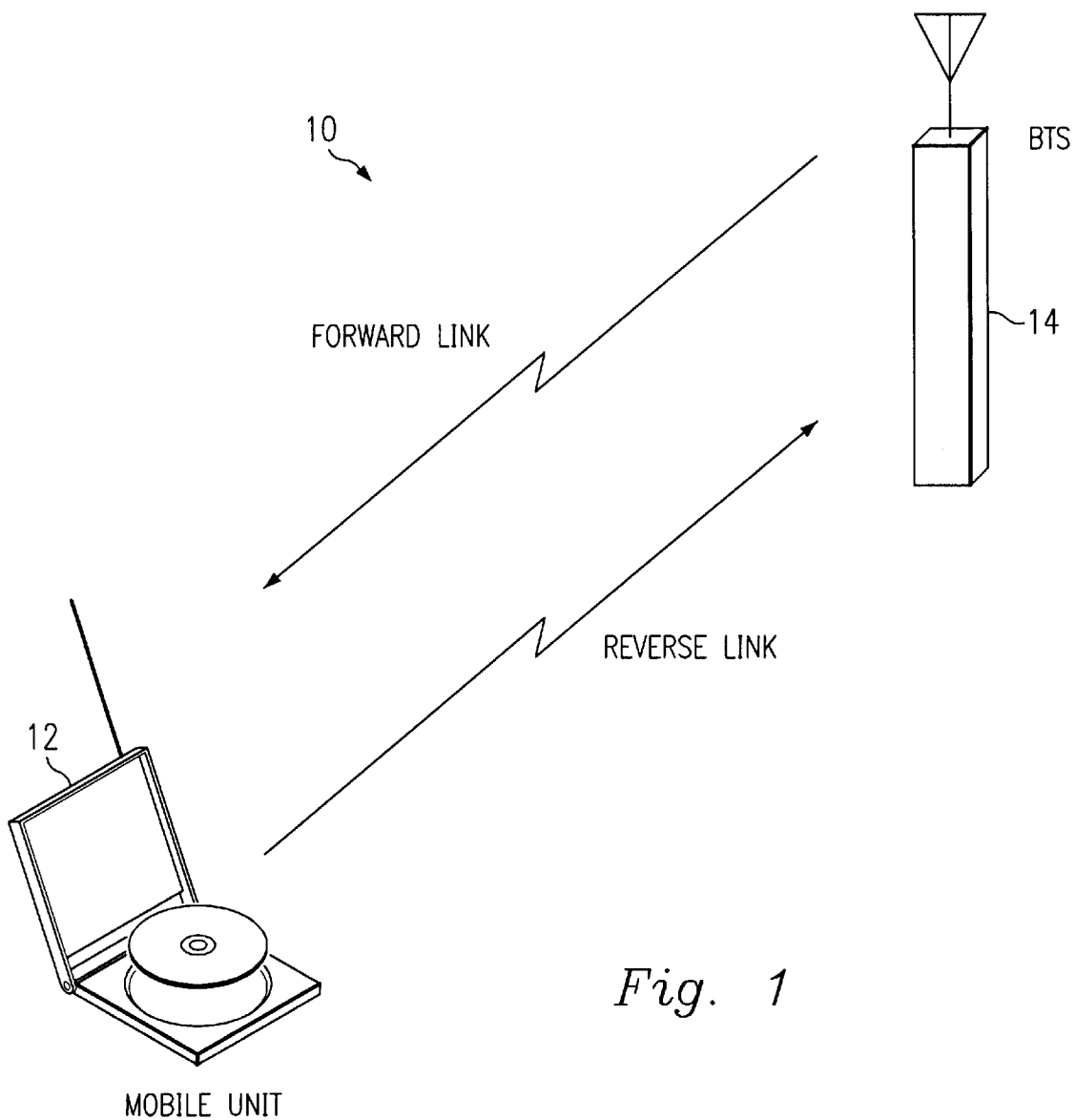
FIG. 1 illustrates a part of a wireless communication network having a base transmission station and a mobile unit.

Referring again to FIG. 1, a common wireless communication network 10 may be used to implement different embodiments of the present invention. For the sake of illustrating examples of the present invention, the network 10 is deemed to be a CDMA2000 wireless network, although many other different networks may also benefit from the present invention. The network 10 includes the mobile unit (MU) 12, which receives transmitted information from a base transmission station (BTS) 14 through a forward link, and communicates back to the BTS through a reverse link.

Figure 2:
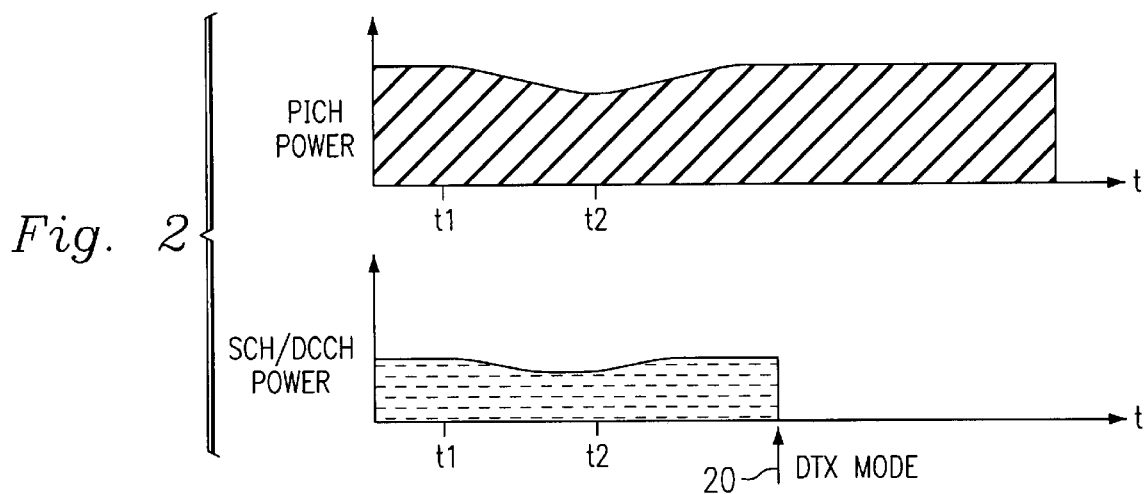
FIG. 2 shows graphical representations of the power levels of both a pilot channel and a supplemental channel (or a dedicated control channel) on a reverse link.

Referring now to FIG. 2, in one embodiment of the present invention, different methods are needed for communications on the forward and reverse links. For the reverse link, the strength of a reverse link pilot channel (PICH) is used to assist in detecting DTX mode. For example, in a CDMA2000 reverse link, an unmodulated PICH is used by the MU 12. Both the strength of PICH and a supplemental channel (SCH), in terms of transmission power, can be measured by the BTS 14. Since the PICH and the SCH experience the same fading condition for the same reverse link, and if the SCH is not in DTX mode, the received power ratio between the SCH and the PICH should be approximately equal to the transmitted power ratio between these two channels. For example, as shown in FIG. 2, the received power ratio between the SCH and the PICH at a time t1 is about the same as a power ratio at a time t2, even though the SCH and PICH have both experienced some fading. It is understood, however, that in some embodiments, the power ratio may actually be determined over a period of time.

In CDMA2000, the transmitted power ratio can be calculated from a set of pre-negotiated parameters such as RLGAIN_SCH_PILOT, RLGAIN_COMMON_PILOT, and RL_GAIN_ADJ. Other parameters are available or readily determinable in different types of network. These predetermined parameters and formulas are used to calculate the transmitted power on each channel known to the BTS 14.

When the SCH enters into the DTX mode, as indicated by an arrow 20, the received power ratio between the SCH and the PICH will be substantially lower than the transmitted power ratio described above because there is nothing being transmitted on the SCH. Therefore, the BTS can set a power ratio threshold between the SCH and the PICH. The threshold should be below the transmitter power ratio in a non-DTX mode, and above the power ratio between noises in the SCH and the regular signal in the PICH. Thus by comparing the received power ratio between the SCH and the PICH with that predetermined threshold value, the BTS can determine whether or not the reverse SCH has entered the DTX mode.

Similarly, since the transmitter power ratio between a PICH and a dedicated control channel (DCCH) is also known to the BTS, the BTS can also measure the received power ratio between the PICH and the DCCH to determine whether or not the reverse DCCH has entered into the DTX mode.

In another embodiment of the present invention, a method for detecting an operational mode change on the forward link is disclosed. Because there is no user-specific pilot transmitted on the forward link, a power control sub-channel (PCSCH) is used to assist in detecting the DTX mode.

Figure 3:
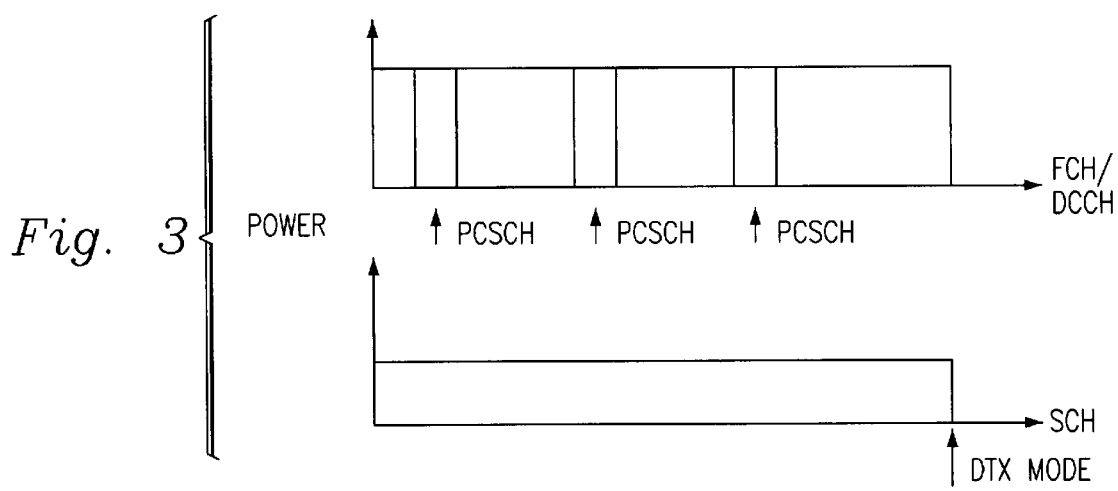
FIG. 3 shows graphical representations of the power levels of both a supplemental channel and a fundamental channel (or a dedicated channel) with a power control sub-channel included therein.

As shown in FIG. 3, the power control sub-channel is usually transmitted on a primary power control channel, such as a fundamental channel (FCH) or a DCCH. It is thus "punctured" into the primary power control channel. When an active set of the SCH is the same as that of the primary power control channel (i.e., a set of different BTSs transmitting to the MU on the primary power control channel is the same set transmitting on the SCH), the power of the primary power control channel is unpredictable because it is adjusted dynamically by the BTS. However, the power of the PCSCH always remains in full scale. Taking advantage of this feature, the MU 12 can measure the received power ratio between the PCSCH and the SCH.

If the active set of the SCH is the same as the PCSCH, then both channels must experience the same fading condition. If the active set of these two channels do not change, then the transmitter power ratio between the PCSCH and the SCH should stay the same unless the transmitter enters into the DTX mode. If the transmitter enters into the DTX mode on the SCH, the received power ratio between the SCH and the PCSCH drops dramatically to a ratio between the power of noise and the PCSCH, which is significantly lower than that in a non-DTX mode. Therefore, the BTS can simply monitor the received power ratio between the PCSCH and the SCH to determine whether or not the transmitter has entered into the DTX mode.

The methods described above can still be applied even if the active set of these two channels has changed during a transmission, e.g., when the MU has either entered or exited a soft handoff state. In this case, the BTS adjusts the transmitter power level of PCSCH independently. However, given that both the amplitude and execution time of this adjustment are known to the MU 12, the MU can keep track of the transmitted power ratio change between the SCH and the PCSCH accordingly. Therefore, such adjustment does not affect the MU's ability of detecting the DTX mode on the SCH.

Figure 4:
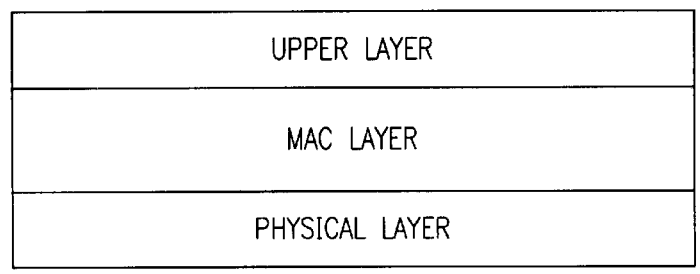
FIG. 4 illustrates different layers of network communication interface.

Referring now to FIG. 4, in yet another embodiment, a medium access layer (MAC) application can be used for detecting the DTX mode on a SCH and a DCCH. The MAC layer is one of the access layers defined by the telecommunication industry. A Multiplex Sublayer entity (MUX) in the MAC Layer sends and receives user data to and from a Physical Layer, which is another access layer defined by the telecommunication industry. The information transported between the MUX and the Physical Layer is in the form of a Physical Layer Service Data Unit (SDU). A SDU is comprised of one or more MUX protocol data units (PDUs) of the same type. Each MUX PDU contains a MUX header and user data. In addition, a configured MUX option number is known to both a transmitter and a receiver before data is exchanged. Depending on which communication link is involved, the transmitter can be the BTS 14 (or the MU 12), and the receiver is the MU (or the BTS, respectively). This MUX option number decides which type of MUX PDU is included in the Physical Layer SDU to be transmitted over the air. Using this control feature, the DTX mode can be indicated to the receiver. For example, before a transmitter enters the DTX mode, the transmitter MUX delivers a special SDU, named DTX SDU, to the Physical Layer. The DTX SDU indicates that DTX will start from the next physical layer transmission cycle. The format of the DTX SDU can be predetermined.

For example, if the configured MUX option number is 3 or 4, the DTX SDU will contain all "1" bits. For all other configured MUX option numbers, the DTX SDU will contain a MUX PDU with a unique type, e.g., a Fill MUX PDU, and followed by either all "0" bits or more Fill MUX PDUs to fill any remaining space in the SDU. The Fill MUX PDU, as defined in the IS-2000-3 standard, includes a MUX header and all "0" bits. Therefore, knowing the configured MUX option number up front, the receiving MUX is able to detect whether the transmitter has entered into the DTX mode by recognizing the received SDU as a DTX SDU. Once the DTX mode is detected, the receiving MUX can send an indication to the Physical Layer. Such an indication assists the Physical Layer to maintain a correct determination of erasure frames.

The above disclosure provides many different embodiments, or examples, for implementing different features of the invention. Specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for detecting a discontinuous transmission mode of a control channel transmitted between a mobile unit and a transmitter station in a telecommunications network, the method comprising:

obtaining a transmitted power strength ratio between the control channel and a reference channel;

determining a threshold value based on the transmitted power strength ratio;

monitoring a received power strength of the reference channel;

monitoring a received power strength of the control channel;

obtaining a received power strength ratio between the reference channel and the control channel; and detecting the discontinuous transmission mode of the control channel by identifying an abrupt change in the received power strength ratio that crosses the threshold value.

2. The method of claim 1 wherein the transmitted power strength ratio is identified based on a series of pre-negotiated parameters.

3. The method of claim 2 wherein the pre-negotiated parameters includes RLGAIM_SCH_PILOT, RLGAIN_COMMOM_PILOT, RL_GAIN_ADJ.

4. The method of claim 1 wherein the control channel is a supplemental channel in a wide band code division multiple access network.

5. The method of claim 1 wherein the control channel is a dedicated control channel.

6. The method of claim 1 wherein the reference channel is a user-specific pilot channel on a reverse link.

7. The method of claim 1 wherein the reference channel is a power control sub-channel.

8. A method for detecting a discontinuous transmission mode of a control channel on a forward link transmitted from a transmitter station to a mobile unit in a telecommunication network, the method comprising the steps of:

obtaining a transmitted power strength ratio between the control channel and a power control sub-channel;

determining a threshold value based on the transmitted power strength ratio;

monitoring a received power strength of the power control sub-channel;

monitoring a received power strength of the control channel;

obtaining a received power strength ratio between the control channel and the power control sub-channel based on the received power strength of both the power control sub-channel and the control channel; and detecting the discontinuous transmission mode of the control channel by discovering an abrupt change in the received power strength ratio that crosses the threshold value.

9. The method of claim 8 wherein the control channel is a supplemental control channel.

10. The method of claim 8 wherein the power control sub-channel is embedded in a primary power control channel.

11. The method of claim 10 wherein the primary power control channel is a fundamental channel.

12. The method of claim 10 wherein the primary power control channel is a dedicated control channel.

13. The method of claim 8 wherein the transmitted power strength ratio is identified based on a series of pre-negotiated parameters.

14. The method of claim 8 further includes the step of monitoring, by the mobile unit, a change of the transmitted power strength ratio due to a handoff condition.

15. The method of claim 14 wherein the mobile unit obtains a new threshold value based on a new transmitted power strength ratio between the control channel and the changed power control sub-channel due to the handoff.

16. A method for detecting a discontinuous transmission mode of a control channel on a reverse link transmitted from a mobile unit to a transmitter station in a telecommunication network, the method comprising the steps of:

obtaining a transmitted power strength ratio between the control channel and a pilot channel;

determining a threshold value based on the transmitted power strength ratio;

monitoring a received power strength of the pilot channel;

monitoring a received power strength of the control channel;

obtaining a received power strength ratio between the pilot channel and the control channel; and determining the discontinuous transmission mode of the control channel by detecting a change in the received power strength ratio, as compared to the threshold value.

17. The method of claim 16 wherein the transmitted power strength ratio is identified based on a series of pre-negotiated parameters.

18. The method of claim 17 wherein the pre-negotiated parameters includes RLGAIM_SCH_PILOT, RLGAIN_COMMOM_PILOT, RL_GAIN_ADJ.

19. The method of claim 16 wherein the control channel is a supplemental channel in a wide band code division multiple access network.

20. The method of claim 16 wherein the control channel is a dedicated control channel.

* * * * *